United States Patent [19]

Komurasaki et al.

[11] Patent Number: 4,625,691

[45] Date of Patent: Dec. 2, 1986

[54] KNOCK SUPPRESSION SYSTEM FOR INTERNAL COMBUSTION ENGINE

[75] Inventors: Satoshi Komurasaki; Atsushi Ueda; Yoshinobu Morimoto; Youichi Kadota, all of Himeji, Japan

[73] Assignee: Mitsubishi Denki Kabushiki Kaisha, Tokyo, Japan

[21] Appl. No.: 711,061

[22] Filed: Mar. 12, 1985

[30] Foreign Application Priority Data

Mar. 15, 1984 [JP] Japan ................................. 59-51627
Mar. 15, 1984 [JP] Japan ................................. 59-51628
Mar. 15, 1984 [JP] Japan ................................. 59-51629

[51] Int. Cl.[4] ............................................. F02P 5/15
[52] U.S. Cl. ................................................ 123/425
[58] Field of Search ..................................... 123/425

[56] References Cited

U.S. PATENT DOCUMENTS 4,370,963 2/1983 Iwata et al. .
4,508,079 4/1985 Komurasaki et al. ............. 123/425
4,517,944 5/1985 Inoue et al. ......................... 123/425

Primary Examiner—Tony M. Argenbright
Attorney, Agent, or Firm—Leydig, Voit & Mayer, Ltd.

[57] ABSTRACT

A knock suppression system for an internal combustion engine in which the occurrence of knocks is suppressed by quickly providing a corresponding control signal previously stored in a memory and determined on the basis of operating conditions of the engine so that knocks can be effectively suppressed. As the operating conditions vary due to change in ignition timing, A/F ratio, combustion chamber temperature, inlet air temperature, humidity, or the like, the control signal is corrected and updated to compensate for the change in knock level. Also, even at the transient state of the engine where the factors introducing knocks largely vary, a correction control signal corresponding to the variations during the transient operation can be carried out, thereby effectively and quickly suppressing engine knocks.

12 Claims, 31 Drawing Figures

TIME →

TIME →

TIME →

FIG. 7 MODE [1]
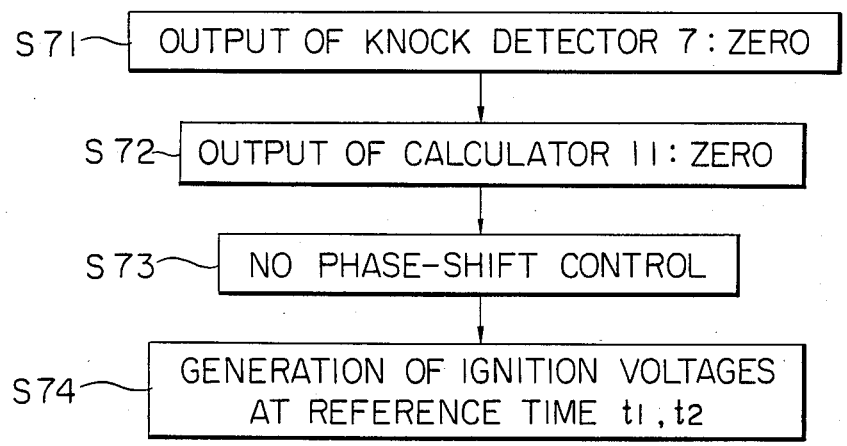
FIG. 8 MODE [2]
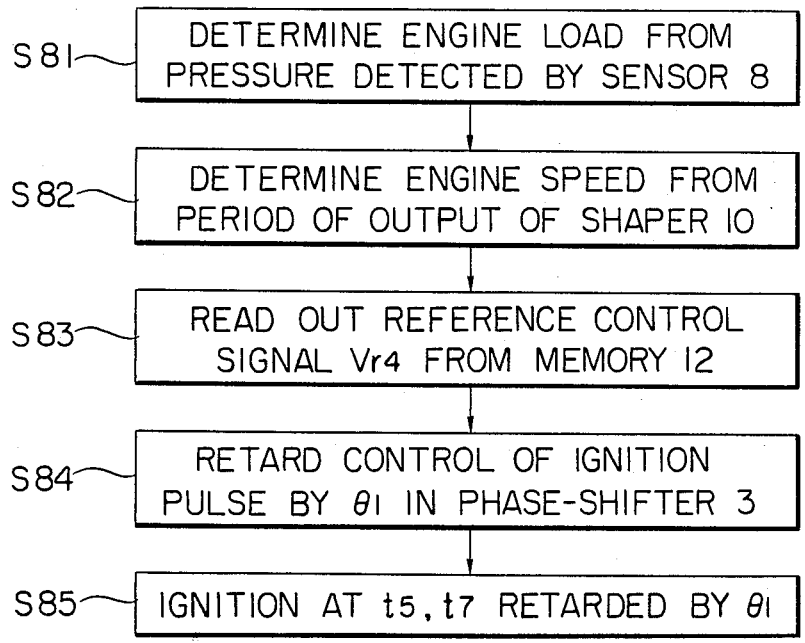

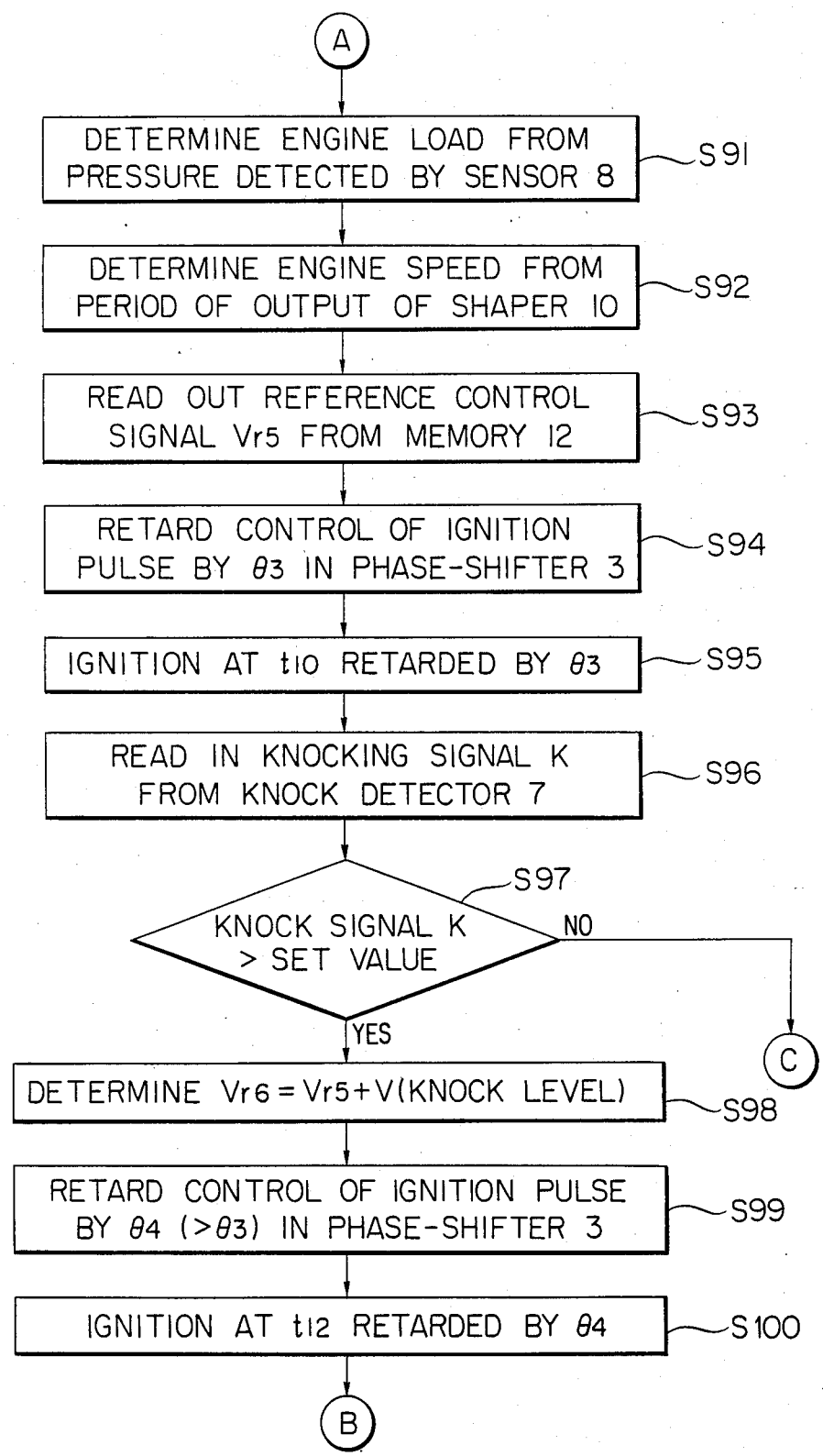
FIG. 9A  MODE [3]

FIG. 11 MODE [3]

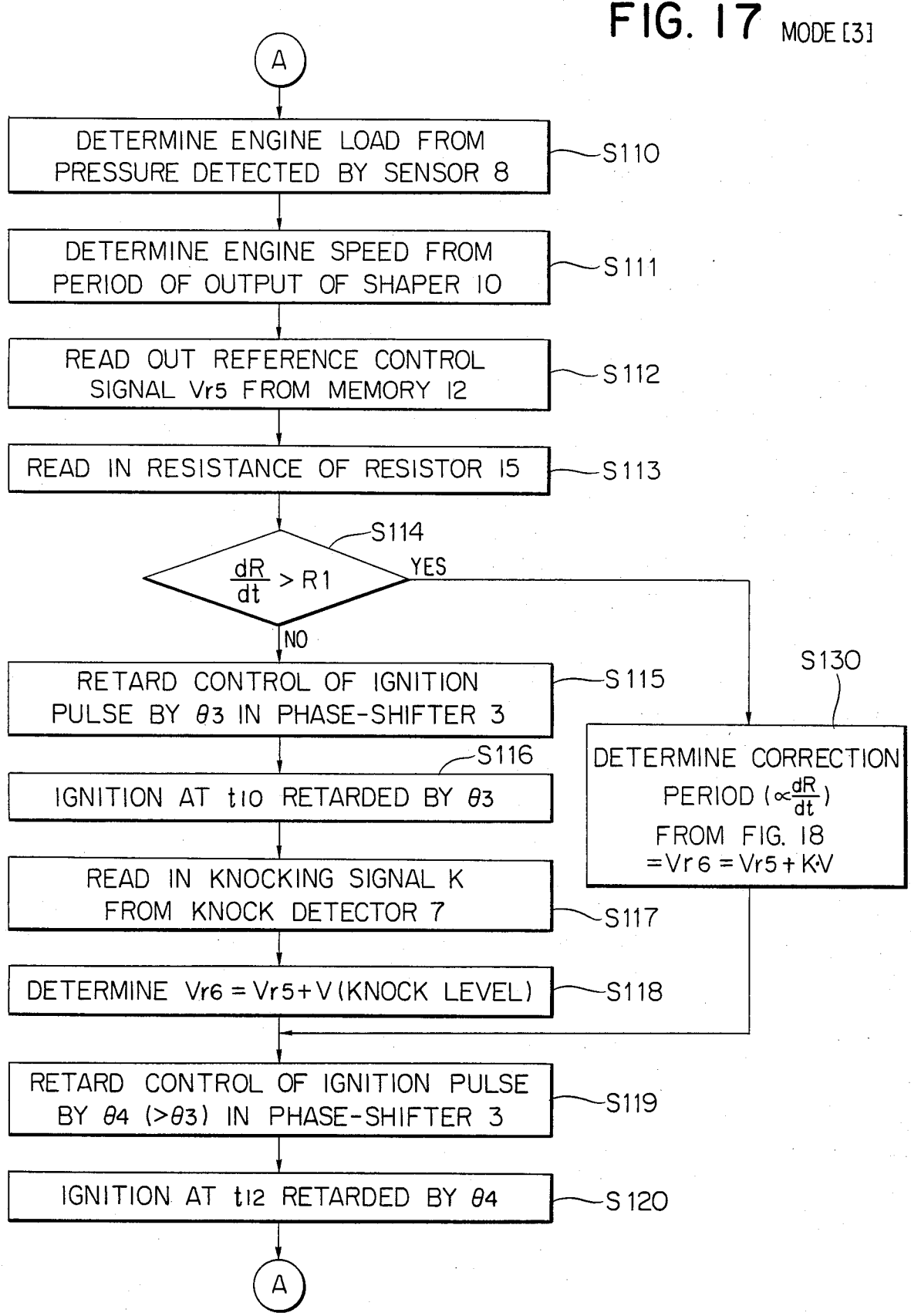
FIG. 17 MODE [3]

KNOCK SUPPRESSION SYSTEM FOR INTERNAL COMBUSTION ENGINE

BACKGROUND OF THE INVENTION

This invention relates to a knock suppression system for an internal combustion engine, and in particular to a knock suppession system capable of completely suppressing knocks at all times even when large variations in factors which generates knocks exist.

In the field of internal combustion engines, the development of knock suppression systems for detecting and suppressing knocks during the engine operation has been energetically made in order to improve the efficiency (fuel consumption) and the output of the engines. While such a knock phenomenon generally occurs in response to variations in numerous factors such as ignition timing, air/fuel ratio, combustion chamber temperature, inlet air temperature, and humidity among the engine operating conditions. In fact, such a knock phenomenon largely depends on the variation of the inlet air temperature and the humidity which, in turn, vary with the seasons of the year. Therefore, the occurrence of knocks alters rhythmically during the period of one year. In other words, the amount of knocks occurring during a short time interval having the same operating conditions is substantially constant so that the frequency of the occurrence and the magnitude of the knocks are substantially constant. Therefore, control signals necessary for the suppression of knocks occurring in the engine for the same operating conditions are not required to be substantially changed during a short time interval.

Hitherto, a knock suppression system based on this fact has been proposed, however, it is incomplete in that corrections can not be carried out in response to the analysis results of specific factors, specifically variations in the above mentioned factors, and therefore, an effective knock suppression has not been realized.

U.S. Pat. No. 4,370,963 discloses the suppression of knocks during a rapid acceleration by rapidly charging an integrator.

SUMMARY OF THE INVENTION

It is accordingly an object of the invention to provide a knock suppression system for an internal combustion engine in which the occurrence of knocks is suppressed by quickly providing a control signal (controlled variable) of an adequate value, necessary for the suppression of the knocks, the control signal being pre-stored in a memory and corresponding to the operating conditions of the engine, and the variation in the above mentioned factors which determine the occurrence of knocks can be sufficiently dealt with so that knocks during the engine operation can be effectively and quickly suppressed.

In order to accomplish this object, a knock suppression system for an internal combustion engine according to the present invention broadly comprises: means for detecting the load condition of the engine; means for detecting the rotating speed of the engine; means for detecting a knock signal at a level corresponding to the knocking intensity of the engine; means for determining whether or not the operating condition of the engine is steady; storage means for storing a reference controlled variable, for the suppression of knocks, corresponding to the level of the knock signal when it is determined by the determining means that the operating condition of the engine determined from the rotating speed and the load condition is steady; means for correcting the reference controlled variable according to the magnitude of the knock signal; and means for retarding an ignition signal to be applied to the ignition coil of the engine according to the corrected reference controlled variable.

The correcting means preferably comprises means for determining whether or not the knock signal is larger than a predetermined value. The correcting means may further comprise means for adding the reference controlled variable with a value corresponding to the level of the knock signal when the knock signal is found to be larger than the predetermined value.

This knock suppression system may further comprise means for updating the reference controlled variable to the added reference controlled variable in the storage means when it is determined that the knock signal is still larger than the predetermined value and the operating condition of the engine is still steady.

The correction means may also comprise means for subtracting a value corresponding to the level of the knocking signal from the reference controlled variable when it is determined that the knock signal is not larger than the predetermined value. The correction means may further comprise means for updating the reference controlled variable to the subtracted reference controlled variable in the storage means.

The determining means generally comprises means for determining that the operating condition of the engine is steady when similar operating conditions within a predetermined range last for a predetermined time interval.

It is another object of the invention to provide a knock suppression system for an internal combustion engine in which, even in the transient state of an engine where the occurrence of knocks largely varies, a correction control corresponding to a knock variation due to the transient state can be carried out, thereby effectively and quickly suppressing the knocks under such an engine condition.

In order to accomplish this object, a knock suppression system for an internal combustion engine according to this invention comprises: means for detecting the load condition of the engine; means for detecting the rotating speed of the engine; means for detecting a knock signal at a level corresponding to the knock intensity of the engine; means for detecting a transient condition in the engine; storage means for storing a reference controlled variable, for the suppression of knocks, corresponding to the level of the knock signal when the operating condition of the engine determined from the rotating speed and the load condition is steady; means, responsive to the transient condition, for correcting the reference controlled variable to a predetermined correction variable; and means for retarding an ignition signal to be applied to the ignition coil of the engine according to the corrected reference controlled variable.

The transient detecting means preferably comprises means for reading in the resistance of a variable resistor (15) interconnected with the throttle valve of the engine, means for calculating the rate change of the resistance, and means for determining whether or not the rate of change is larger than a predetermined value.

The correcting means preferably comprises means for correcting the reference controlled variable to a value proportional to the rate of change of the resistance. Alternatively, the correcting means may comprise means for correcting the reference controlled variable to the summation of the reference controlled variable and the level of the knock signal. The correcting means may comprise means for correcting the reference controlled variable to the summation of the reference controlled variable multiplied by a constant and the reference controlled variable. The correcting means comprises means for correcting the reference controlled variable to the summation of the reference controlled variable and the level of the knock signal multiplied by a constant. The correcting means may comprise means for carrying out the correction for a time interval proportional to the rate of change of the resistance.

BRIEF DESCRIPTION OF THE DRAWINGS

FIG. 7 shows a general flow chart of the control mode [1];

FIG. 8 shows a general flow chart of the control mode [2];

FIGS. 9A–9C in combination show a flow chart of the control mode [3] particularly for the first embodiment of this invention;

FIG. 17 shows a flow chart of the control mode [3] particularly for the third embodiment of this invention;

Throughout the figures, the same reference numerals indicate identical or corresponding portions.

DETAILED DESCRIPTION OF THE PREFERRED EMBODIMENTS

Preferred embodiments of a knock suppressing system for an internal combustion engine according to this invention will now be described in detail with reference to the accompanying drawings.

Figure 1:
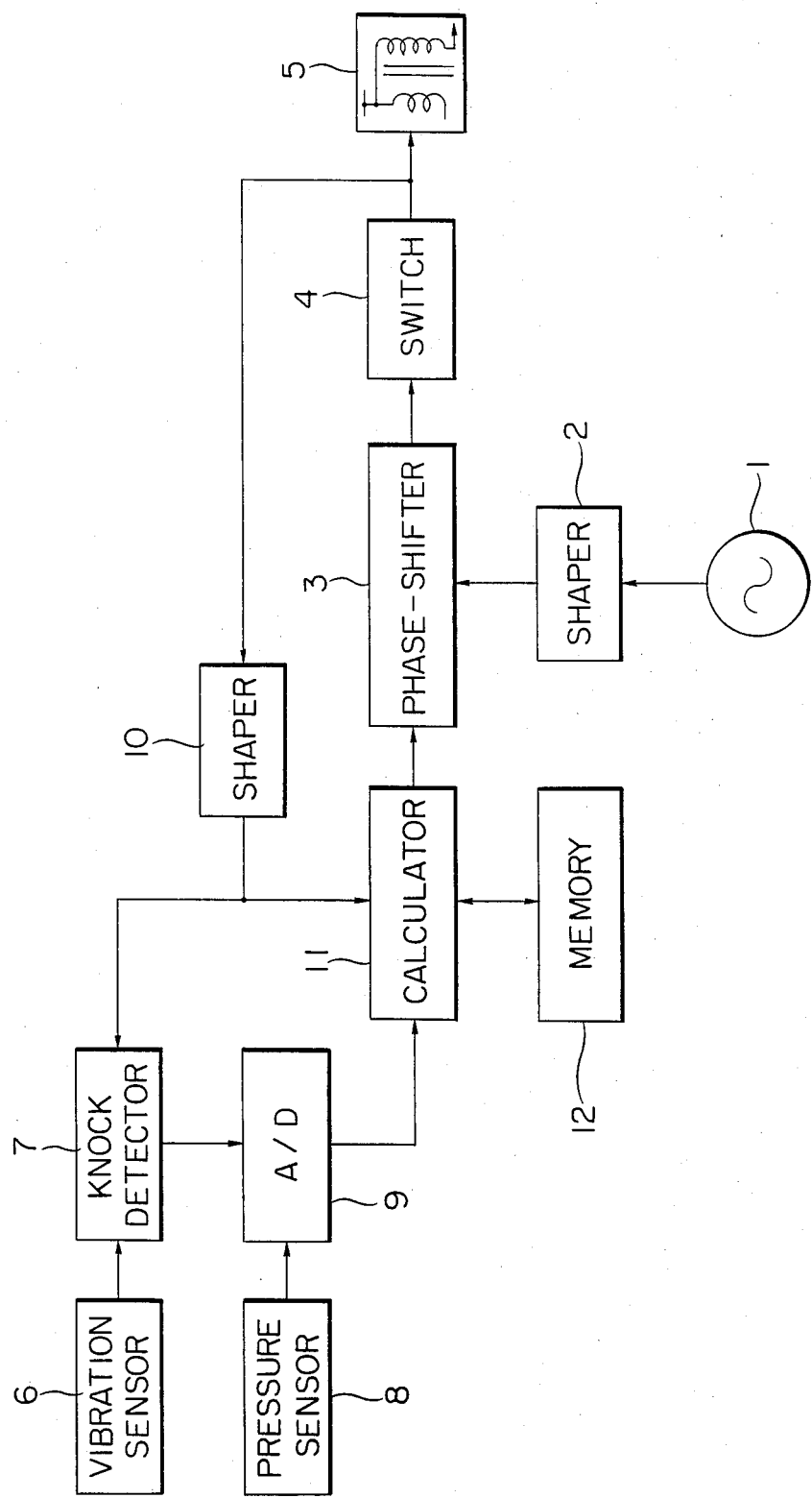
FIG. 1 shows a block diagram of a first embodiment of a knock suppression system for an internal combustion engine in accordance with the present invention.
Figure 3A:
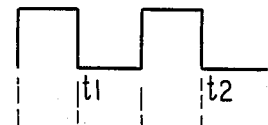
FIGS. 3A–3D respectively show waveforms derived at various points of the arrangement of FIG. 1 in a control mode [1] where no knock control is required.
Figure 4A:
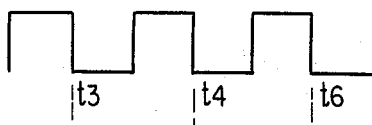
FIGS. 4A–4D respectively show waveforms derived at various points of the arrangement of FIG. 1 in a control mode [2] where some knock control is required.
Figure 4D:
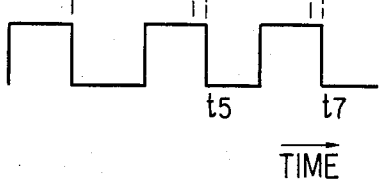
Figure 5A:
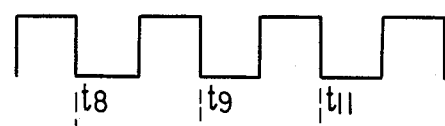
FIGS. 5A–5D respectively show waveforms derived at various points of the arrangement of FIG. 1 in a control mode [3] where a higher knock control is required.
Figure 5B:
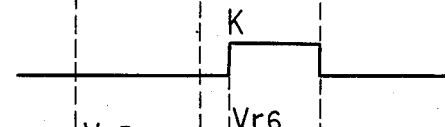

FIG. 1 shows a block diagram of a first embodiment of this invention, in which an ignition signal generator 1 generates a reference ignition signal corresponding to the revolution of an engine (not shown). The ignition signal generator 1 is connected to a waveform shaping circuit 2 which shapes the waveform of the reference ignition signal inputted from the ignition signal generator 1 and simultaneously controls the same in a closed angle manner so that an ignition pulse with a desired pulse width is outputted from the waveform shaping circuit 2 as shown in FIG. 3A, 4A, or 5A. The waveform shaping circuit 2 is connected to a phase-shifter 3 which phase-shifts the phase of the ignition pulse inputted from the waveform shaping circuit 2 toward the retard side according to a control signal from a calculator which will be later described and provides as an output therefrom a phase-shifted pulse as shown in FIG. 3D, 4D, or 5D. A switch circuit 4 is connected to the phase-shifter 3 and switches or interrupts the supply of electrical energy to an ignition coil 5 in response to the ignition pulse inputted from the phase-shifter 3.

A vibration sensor 6 detects vibrations during the acceleration of the engine and outputs a vibration signal. The vibration sensor 6 is connected to a knock detector 7, which sorts out a knock component corresponding to knocks occuring in the engine from the vibration signal inputted from the vibration sensor 6, outputs a knock signal, shown in FIG. 3B, 4B, or 5B, at a level corresponding to the knock intensity, and is reset by a pulse having a constant duration from a waveform shaping circuit 10 which will be later described.

A pressure sensor 8 detects the internal pressure of an inlet air pipe (not shown) of the engine and outputs a pressure signal corresponding to the detected pressure. The knock detector 7 and the pressure sensor 8 are connected to an A/D converter 9 which converts the knock signal inputted from the knock sensor 7 and the pressure signal inputted from the pressure sensor 8 into respective digital signals corresponding in level to each other and outputs those digitized knock and pressure signals. The above noted waveform shaping circuit 10 receives as an input the driving terminal voltage of the ignition coil 5 and outputs a pulse having a constant duration at the ignition times which is applied to the knock detector 7 as well as the above noted calculator 11. The calculator 11 determines the operating condition of the engine from the digitized pressure signal from the A/D converter 9 and the constant duration pulse from the waveform shaping circuit 10, and determines the knock intensity from the digitized knock signal from the A/D converter 9 to calculate and output a control signal, shown in FIG. 3C, 4C, or 5C, by receiving as an input a reference control signal Vr stored in a memory 12 which will be later described. This calculator 11 calculates the reference control signal Vr when the same operating condition is continuously retained over a predetermined time interval (a time interval for which the ignition operation is carried out by a predetermined frequency) and updates the reference control signal Vr stored in the memory 12. The memory 12 has stored therein the reference control signal Vr shown in FIG. 2 as the calculated output and the updated output of the calculator 11.

It is to be noted that the ignition signal generator 1, the waveform shaping circuit 2, the phase-shifter 3, the switching circuit 4, and the ignition coil 5 form an igniter and that the vibration signal outputted from the vibration sensor 6 includes a noise signal (e.g. a noise signal detected during the actuation of the engine valves) due to mechanical noise resulting in the engine and a knock component resulting from vibrations due to knocks.

Figure 2:
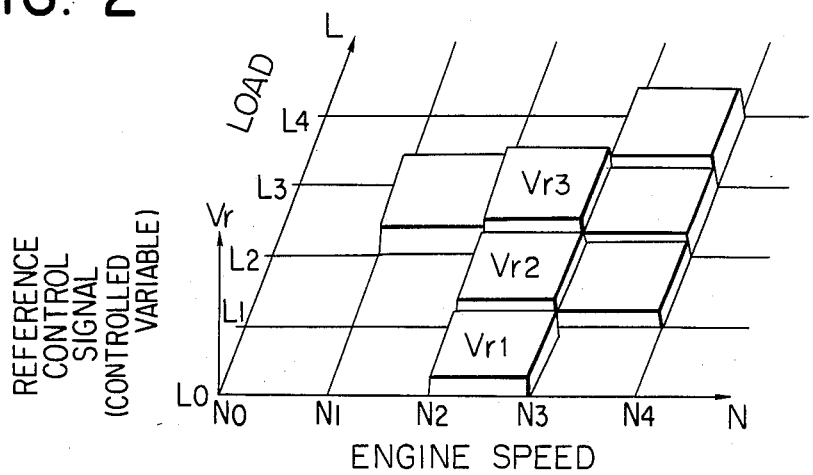
FIG. 2 shows a memory map of reference controlled variables as a function of the rotating speed and the load of an engine.

FIG. 2 shows one example of reference control signals, which are also referred to as reference controlled variables, stored in the memory 12 as a function of the operating conditions of the engine, as above described. As seen from FIG. 2, the operating conditions are defined by the load on the engine L0-L4 and the speed of the engine N0-N4.

The reference control signals Vr stored in the memory 12 and shown in FIG. 2 have varying values such that in the common range of engine speeds, e.g., N2-N3, a reference control signal Vr1 is provided in the range of loads L0-L1, a reference control signal Vr2 is provided in the range of loads L1-L2, and a reference control signal Vr3 is provided in the range of loads L2-L3 so that the reference control signal becomes large as the load on the engine increases.

These reference control signals Vr1, Vr2, and Vr3 are continuously updated to respectively new proper controlled variables determined by the respective operating conditions while the engine operation is continuously retained in the same operating condition for a predetermined time interval. Namely, for example, while the engine operation is in the range of the loads L0-L1 and in the range of the speeds n2-N3 for a predetermined time interval, a new reference control signal is determined and is stored as a newly updated control signal Vr1.

FIGS. 3A-3D show waveforms at various points in the arrangement of FIG. 1 in the operating condition of the engine where no knock control is required, FIGS. 4A-4D show waveforms at various points in the arrangement of FIG. 1 in the operating condition where a knock control is required, and FIGS. 5A-5D show waveforms at various points in the arrangement of FIG. 1 in the operating condition of the engine where the combustion conditions of the cylinders are somewhat different from each other and a controlled variable by means of the reference control signal in FIGS. 4A-4D is somewhat insufficient.

The general operation of the knock suppression system thus constructed will now be described with reference to the flow charts shown in FIGS. 6A and 6B.

First of all, the ignition signal generator 1 generates an ignition signal corresponding to the rotating speed of the engine, the ignition signal being shaped and controlled in a closed angle manner by the waveform shaping circuit 2 and outputted from the waveform shaping circuit 2 in the form of an ignition pulse. This ignition pulse is inputted through the phase-shifter 3 to the switching circuit 4 which in turn interrupts the supply of electrical energy to the ignition coil 5 in response to the ignition pulse signal, whereby ignition signals for the cylinders are developed by ignition voltages generated by the ignition coil 5 at the time of interruptions of the supply of electrical energy, thereby providing an operating condition for the engine.

During the operating condition of the engine, the pressure sensor 8 detects the internal pressure of the inlet air pipe and outputs a pressure signal corresponding to the pressure to the A/D converter 9. The A/D converter 9 digitizes the pressure signal inputted therein and outputs the same as a signal indicative of the load conditions on the engine to the calculator 11. Namely, since the internal pressure of the inlet air pipe varies sharply in response to the load condition on the engine, the load condition on the engine can be determined from the level of the pressure signal. Furthermore, in this case, the vibration sensor 6 detects the vibration acceleration of the engine and outputs the vibration signal to the knock detector 7 which, in turn, sorts out the knock component from the vibration signal and outputs a knock signal at a level corresponding to the knock intensity to the A/D converter 9 which, in turn, digitizes the knock signal inputted therein and outputs the digitized knock signal to the calculator 11.

Figure 6A:
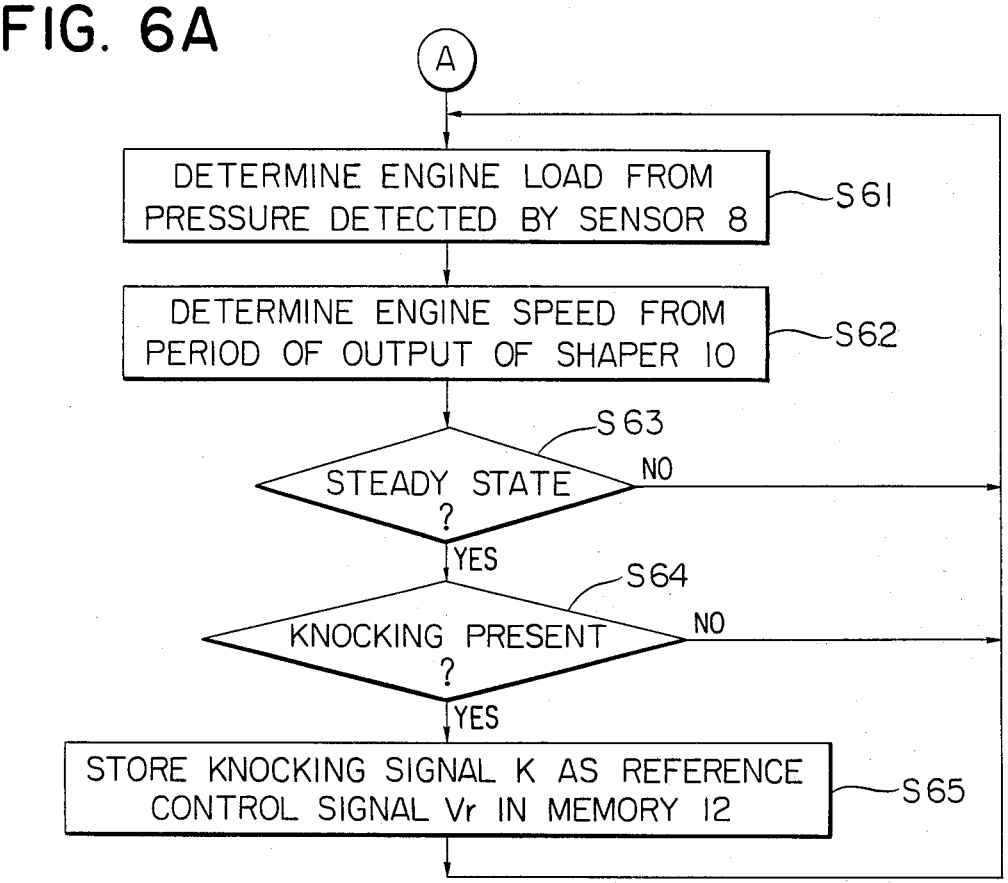
FIGS. 6A and 6B respectively show general flow charts of a method for preparing a memory map shown in FIG. 2.

The calculator 11 then determines the speed of the engine on the basis of the period of the constant duration pulse imputted from the waveform shaping circuit 10, and determines the load condition of the engine on the basis of the digitized pressure signal inputted from the A/D converter 9 (Steps 61 and 62 of FIG. 6A) whereby the operating condition of the engine is determined from these digital values as shown in Step 63 of FIG. 6A. At the same time, the calculator 11 detects the knocks occurring in the engine on the basis of the digitized knock signal inputted form the A/D converter 9 (Step 64 of FIG. 6A).

Now, if knocks arise in the engine, the calculator 11 determines the operating condition of the engine based on the constant duration pulse and the pressure signal as above described, while when the calculator 11 determines from the counting of the constant duration pulse at every ignition that the operating condition is fixed over a predetermined time interval, indicating a steady state, the calculator 11 stores in the memory 12 the knock signal at this time as a reference control signal for the operating condition (Step 65 of FIG. 6A). For example, if the engine operation in the ranges of, for example, the engine speeds N2-N3 and the loads L0-L1 shown in FIG. 2 continues for a predetermined time interval, the knock at this time will be stored as the reference control signal Vr1 in the memory 12. Likewise, in each of the various operating conditions where knock signals arise in the engine, the knock signals respectively corresponding to the various operating conditions are stored in the memory 12 as the reference control signals Vr corresponding to the respective operating condition whereby the memory map of the reference control signals Vr can be prepared as shown in FIG. 2. Thus, various reference control signals as shown in FIG. 2 are respectively stored in the memory 12 as the operating condition of the engine varies.

Figure 6B:
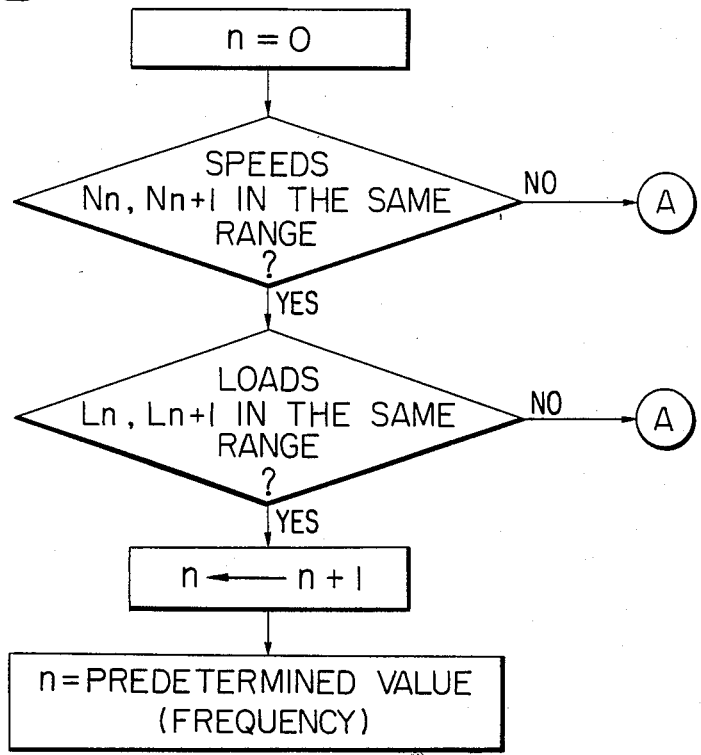

The above process for judging the steady state in Step 63 of FIG. 6A is specifically shown in FIG. 6B. As will be seen from this flow chart, adjacent engine speeds and adjacent engine loads are respectively compared and if they are found to be in the same range and three findings are repeated at a predetermined frequency (times) or more, then it is determined that the engine is operating in a steady state.

More specifically, the operation of this system in the operating conditions of the engine will now be described.

Figure 3B:
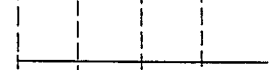
Figure 3C:
Figure 3D:
Figure 4B:
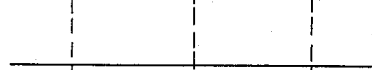

[1] The case of the operating condition where no knock control is required (see FIGS. 3A–3D and the flow chart of FIG. 7) will be described herebelow:

In this case, the output of the knock detector 7 is zero as shown in FIG. 3B and Step 71 of FIG. 7 so that the output of the calculator 11 also becomes zero as shown in FIG. 3C and Step 72 of FIG. 7 whereby a phase-shift control in the phase-shifter 3 is not carried out and an ignition signal, as shown in FIG. 3D and Step 73 of FIG. 7, in phase with the ignition pulse output (FIG. 3A) from the waveform shaping circuit 2 is inputted into the switching circuit 4. Therefore, the switching circuit 4 interrupts the power supply to the ignition coil 5 at reference points t1 and t2 in response to the inputted ignition pulse, thereby developing the ignition voltage for normally operating the engine as shown in Step 74 of FIG. 7.

Figure 4C:
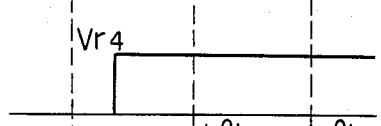

[2] The case of the operating condition of the engine where a knock control is required (see FIGS. 4A–4D and the flow chart of FIG. 8) will be described herebelow:

In this case, after ignition at time point t3, an operating condition requiring a knock control appears in which the calculator 11 determines the operating condition from the period of the constant duration pulse inputted from the waveform shaping circuit 10 and the level of the pressure signal inputted from the pressure sensor 8 through the A/D converter 9, and reads out a reference control signal Vr4 corresponding to the operating condition from the memory 12 and outputs the same to the phase-shifter 3 as shown in FIG. 4C (Steps 81–83 of FIG. 8). In response to the reference control signal Vr4, therefore, the phase-shifter 3 outputs to the switching circuit 4 an ignition pulse which is phase-shifted in the retard direction by an angle $\theta_1$ as shown in FIG. 4D from the phase angle of the ignition pulse (FIG. 4A) from the waveform shaping circuit 2 (Step 84 of FIG. 8). The switching circuit 4 then interrupts the power supply to the ignition coil 5 at time points t5 and t7, as shown in Step 85 of FIG. 8, in response to the phase-shifted ignition pulse which are respectively retarded by $\theta_1$ from the reference times t4 and t6, so that the ignition voltage is generated to operate the engine, resulting in the elimination of knocks and in a steady operation of the engine.

Figure 5C:
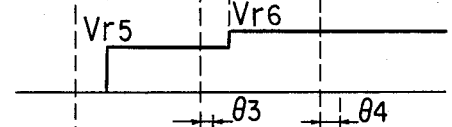
Figure 5D:
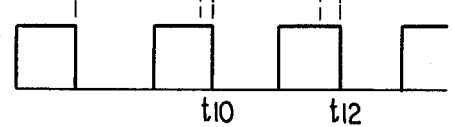

[3] The case of the operating condition where the combustion conditions and the cylinders of the engine are somewhat different from each other and a controlled variable by means of the reference control signal shown in FIG. 4C is somewhat insufficient for controlling the knocks arising in the engine so that knock at a low level may still arise and therefore some correction is required for the insufficiency of the controlled variable (see FIGS. 5A–5D and the flow chart of FIG. 9) will be described herebelow:

In this case, after ignition at time point t8, an operating condition requiring a knock control appears in which the calculator 11 determines the operation condition from the period of the constant duration pulse inputted from the waveform shaping circuit 10 and the level of the pressure signal inputted from the pressure sensor 8 through the A/D converter 9, and reads out a reference control signal Vr5 corresponding to said operating condition from the memory 12 and outputs the same to the phase-shifter 3 as shown in FIG. 5C and Steps 91–93 of FIG. 9A. In response to the reference control signal Vr5, therefore, the phase-shifter 3 outputs to the switching circuit 4 an ignition pulse which is phase-shifted in the retard direction by an angle $\theta_3$ as shown in FIG. 5D from the phase angle of the ignition pulse (FIG. 5A) from the waveform shaping circuit 2 (Step 94 of FIG. 9A). The switching circuit 4 then interrupts the power supply to the ignition coil 5 at a time point t10 in response to the phase-shifted ignition pulse which is retarded by $\theta_3$ from the reference time t9, so that the ignition voltage is generated to operate the engine (Step 95 of FIG. 9A).

In this case, although the engine is ignited as the time point t10 which is retarded by the angle $\theta_3$ as above noted, if the combustion condition is slightly varied so that knocks at a low level may still arise, a knock signal K is provided as an output from the knock detector 7 as shown in FIG. 5B and Step 96 of FIG. 9A. It is then checked in Step 97 of FIG. 9A whether or not the knock signal K is larger than a predetermined value. If the knock signal K is larger than the predetermined value, the following steps will be executed while otherwise steps following "C" in FIG. 9A will be executed as will be described later.

In response to the knock signal K, the calculator 11 outputs a reference control signal Vr6 added with the above reference control signal Vr5 by a corrective variable corresponding to the level (V) of the knock signal K (Step 98 of FIG. 9A) whereby the next ignition is corrected to be made at a time point t12 retarded by an angle $\theta_4$ from the reference time t11 (Steps 99 and 100 of FIG. 9A), with the result that even successively arising knocks having a low level can be sufficiently suppressed so that the engine is properly operated without knocks.

In this case, the angle $\theta_4$ is larger than the angle $\theta_3$ and the difference therebetween, i.e. the correction angle is $\theta_4-\theta_3$ which corresponds to the level (V) of the knock signal K. While the knock signal K varying based on the variation of the knock condition (i.e. combustion condition), the knock signal K represents the difference between the reference controlled variable (reference control signal Vr) stored in the memory 12 and the actual controlled variable inputted into the phase-shifter 3. Namely, the condition where the knock signal K arises indicates that the corresponding reference controlled variable to be stored in the memory 12 is displaced from an adequate value, that is to say the stored reference controlled variable is smaller than the adequate value in this case. Accordingly, it is necessary to update the reference controlled variable stored in the memory 12 to the adequate value by correcting the reference controlled variable to a larger variable corresponding to the level of the knock signal K.

It is to be noted that while in updating the above reference controlled variable it is desired to determine the updating value from numerous values monitored under the various stable or steady conditions of the engine, it is actually impossible to determine all of the knock data so that an adequate updating value is usually determined from a predetermined number ("n" in FIG. 6B) of knock data which are practically effective and sufficient.

For this purpose, it is additionally necessary to discriminate whether or not the engine is under the stable operating conditions. In this embodiment, this discrimination is carried out as to the operating conditions for a predetermined time interval (predetermined frequency "n" of the constant duration pulses) in which it is discriminated that if this condition is fixed, i.e. does not vary, the engine is under a steady state.

For example in FIG. 2, when the operating condition in the ranges of the speeds N2–N3 as well as the loads L0–L1 of the engine lasts for the predetermined time interval, it can be decided that the engine is under the steady state. It is to be noted that the above noted predetermined time intervals can be determined precisely and readily as data (combustion frequency) by counting a requisite ignition frequency for the engine operation, i.e., by counting the constant duration pulse from the waveform shaping circuit 10 in this embodiment.

Figure 9B:
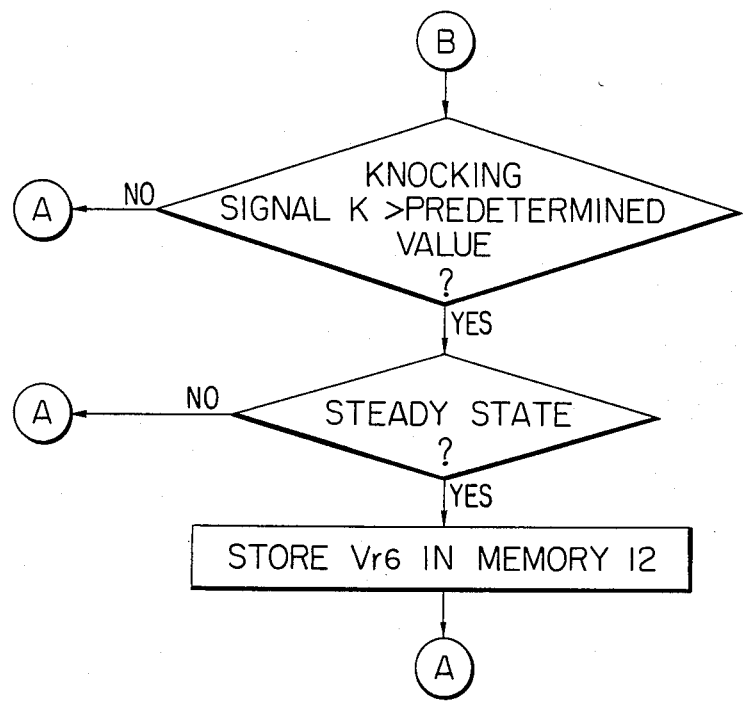

FIG. 9B shows an updating general flow chart for executing the above processes, in which if the knock signal K is larger than the predetermined value and the engine exhibits its steady state, then Vr6 as determined in Step 98 of FIG. 9A is stored as an updated value in the memory 12. It is to be noted that the judgement step of the steady state of the engine in FIG. 9B is the same as shown in FIG. 6B.

While in the above embodiment, the reference controlled variable stored in the memory 12 is smaller than the actual controlled variable (adequate value) so that the reference controlled variable is to be increased to the larger updated value, the reference controlled variable may be conversely larger than the adequate value so that the reference controlled variable is to be decreased to the lower updated value. In this event, since the reference controlled variable is larger than the adequate value, the knock signal K does not arise or is smaller than the predetermined value (V). Therefore, if a steady state where no knock signal K arises is found, then the reference controlled variable will be reduced to the lower updated adequate value.

Figure 9C:
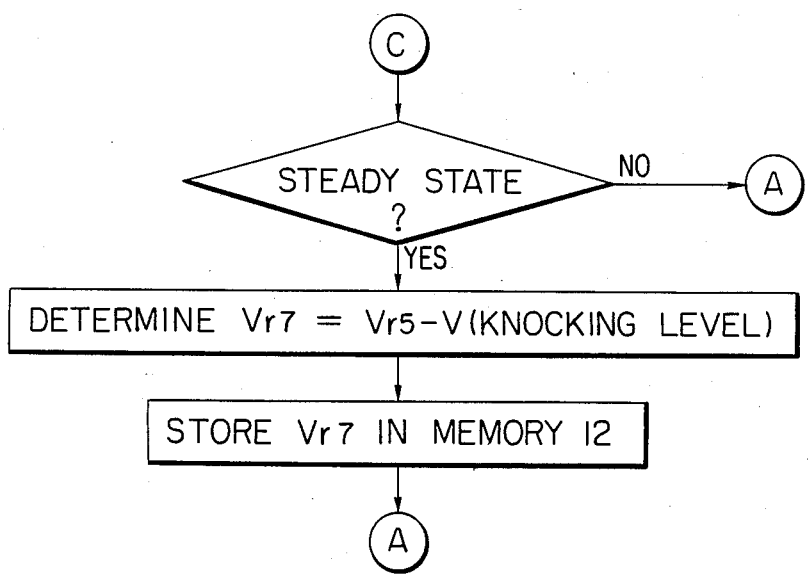

FIG. 9C shows an updating general flow chart for executing the above process. It is to be noted that the judgement step of the steady state of the engine in FIG. 9C is the same as shown in FIG. 6B.

Thus, from the presence/absence of the knock signal K during the steady state and the level thereof, the necessity of the correction for the reference controlled variable stored in the memory 12 as well as the correcting variable can be readily determined.

Accordingly, if, as in the above case, the actual controlled variable largely varies upwards beyond the reference controlled variable read out from the memory 12 by a predetermined value in Step 97 of FIG. 9A, the reference control signal (controlled variable) can be corrected corresponding to such a large variation of the state of the occurrence of the engine knocks by correcting, i.e., updating the stored reference controlled variable. As a result, it will be possible to carry out corrections corresponding to the season's variation of the above noted occurrence factor of knocks so that the reference control signal having an adequate value can be always stored in the memory 12.

As the initial values of the reference control signals (reference controlled variable) stored in the memory 12, those determined from settings for engine knocks may be previously stored, or the average values of these values may be previously stored without variation, the initial controllability of this system in either of these cases can be improved as compared to the initial value being set to zero.

While in the above embodiment, the resetting of the knock detector is carried out at every ignition time, this invention is not limited to this embodiment but the resetting may be, of course, carried out at an ignition time after the occurrence of knocks. Furthermore, detected signals may be summed to detect the variable at the time of the occurrence of knocks for the correcting control, in which the knock detector 7 may be reset when the variable reaches a predetermined value.

According to the above embodiments, knock signals at a level corresponding to the knock intensity are derived from the vibrating acceleration of the engine while the operating condition of the engine is determined from the load condition as well as the speed of the engine whereby various reference controlled variables for the suppression of the knocks corresponding to the respective operating conditions of the engine are previously stored, thereby providing a control signal for the knock control on the basis of the knock signal and the reference controlled variables upon the occurrence of knocks. Accordingly, a knock suppression adequately corresponding to the operating conditions upon the occurrence of knocks is quickly provided while for the variation in the factors of the occurrence of the knocks, a correction corresponding to the variable is carried out and sequentially corrected, thereby enabling an effective knock control at all times. Moreover, in cases where the operating condition lasts under a predetermined condition for a predetermined time interval obtained by counting the frequency of the ignition pulse etc., with the result that the correction variable is determined to be higher than an adequate value, or where an identical operating condition is repeated by a predetermined frequency for the predetermined time interval with the result that the correction value is determined to be lower than the adequate value, a large variation of the factor of the occurrence of knocks can be fully followed in order to correct the stored reference controlled variable.

Next, a second embodiment of a knock suppression system for an internal combustion engine according to this invention will now be described.

Figure 10:
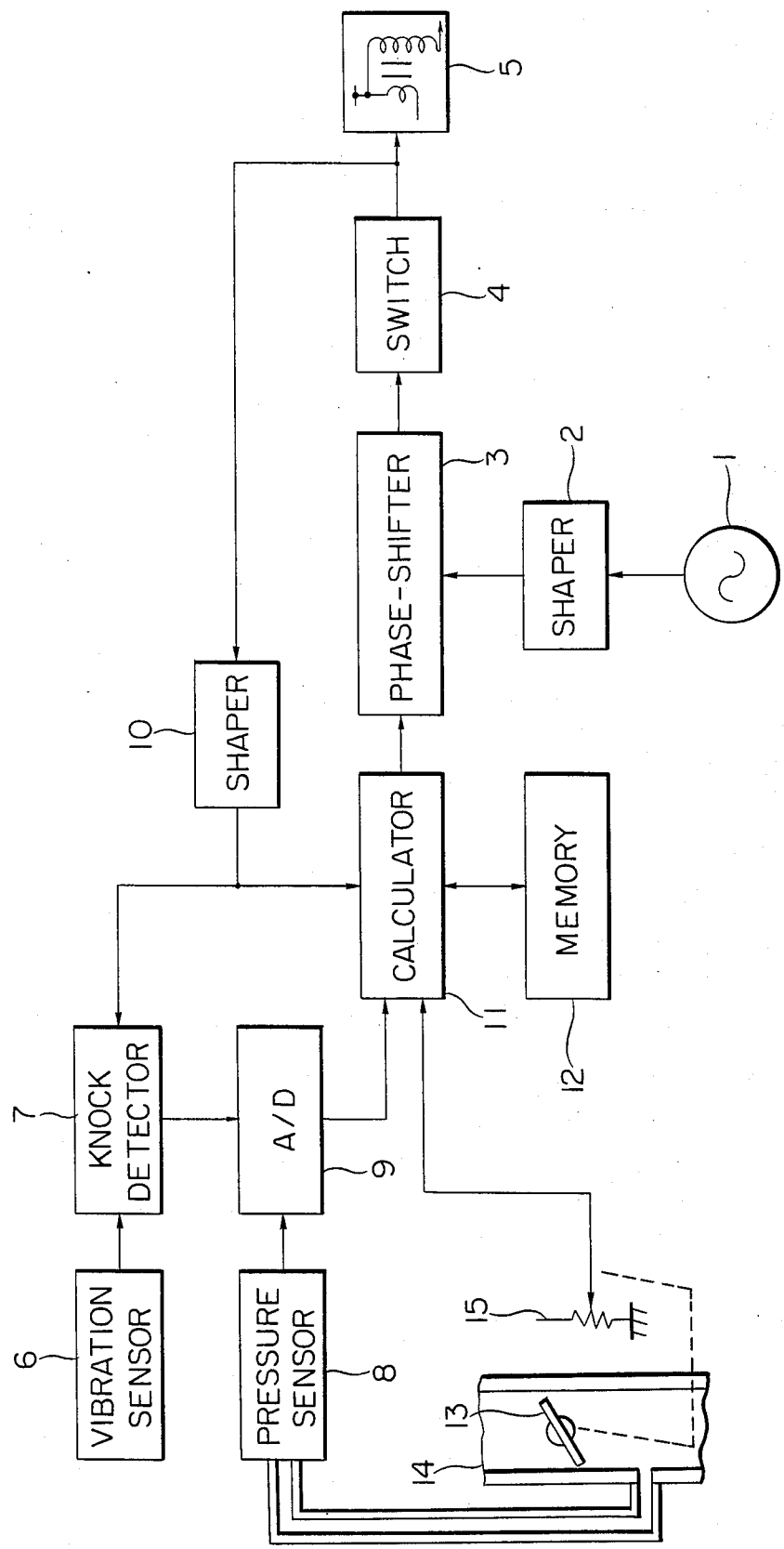
FIG. 10 shows a block diagram of a second or third embodiment of a knock suppression system for an internal combustion engine in accordance with the present invention.

Referring to FIG. 10 showing the second embodiment of this invention, it is seen from the comparison with FIG. 1 showing the first embodiment of this invention that in the second embodiment there are additionally provided a throttle valve 13 disposed within an inlet air pipe 14 for controlling the output of the engine and a variable resistor 15 which is interconnected to the throttle valve 13, thereby being varied in response to the movement of the throttle valve 13.

With regard to the control modes [1] and [2] as described above and shown in the flow charts of FIGS. 6A, 6B, 7 and 8 as to the first embodiment, the same operations are carried out so that the descriptions thereof will not be repeated. Therefore, only the control mode [3] will be described herebelow.

Figure 11:
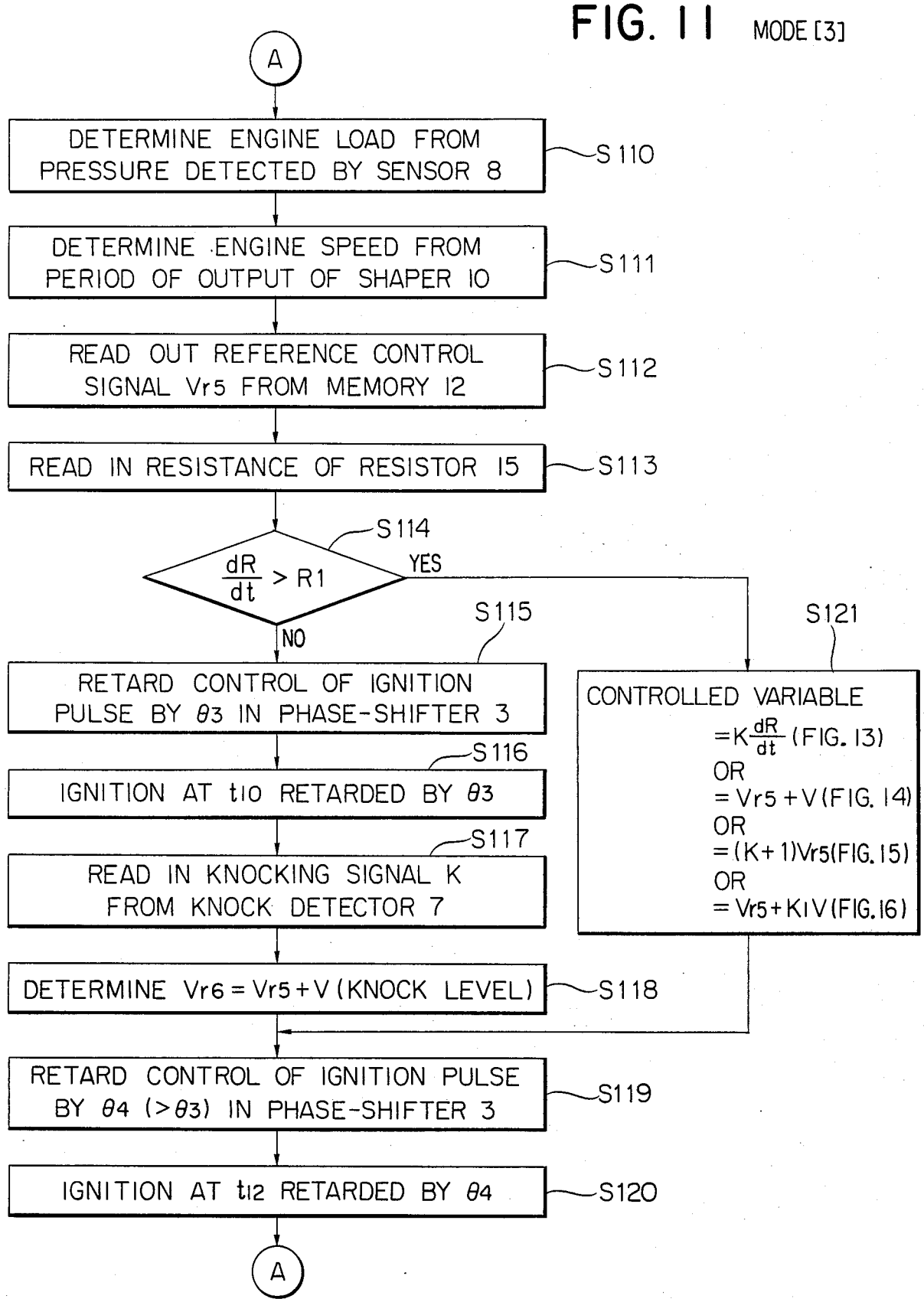
FIG. 11 shows a flow chart of the control mode [3] particularly for the second embodiment of this invention.

The case [3] shows the operating condition where the combustion conditions of the cylinders of the engine are somewhat different from each other and a controlled variable by means of the reference control signal shown in FIG. 4C is somewhat insufficient for controlling the knocks arising in the engine so that knock at a low level may still arise and therefore some correction is required for the insufficiency of the controlled variable (see FIG. 5A–5D and the flow chart of FIG. 11):

In this case, after ignition at time point t8, an operating condition requiring a knock control appears in which the calculator 11 determines the operation condition from the period of the constant duration pulse inputted from the waveform shaping circuit 10 and the level of the pressure signal inputted from the pressure sensor 8 through the A/D converter 9, and reads out a reference control signal Vr5 corresponding to said operating condition from the memory 12 and outputs the same to the phase-shifter 3 as shown in FIG. 5C and Steps 110–112 of FIG. 11.

If there is no transient operating condition, Steps 113 and 114 of FIG. 11 are skipped directly passing to Step 115. In this Step, in response to the reference control signal Vr5, therefore, the phase-shifter 3 outputs to the switching circuit 4 an ignition pulse which is phase-shifted in the retard direction by an angle $\theta_3$ as shown in FIG. 5D from the phase angle of the ignition pulse (FIG. 5A) from the waveform shaping circuit 2. The switching circuit 4 then interrupts the power supply to the ignition coil 5 at a time point t10 in response to the phase-shifted ignition pulse which is retarded by $\theta_3$ from the reference time t9, so that the ignition voltage is generated to operate the engine (Step 116 of FIG. 11).

In this case, although the engine is ignited at the time point t10 which is retarded by the angle $\theta_3$ as above noted, if the combustion condition is slightly varied so that knocks at a low level may still arise, a knock signal K is provided as an output from the knock detector 7 as shown in FIG. 5B and read in by the calculator 11 as shown in Step 117 of FIG. 11. In response to the knock signal K, the calculator 11 outputs a reference control signal Vr6 added with the above reference control signal Vr5 by a corrective variable corresponding to the level (V) of the knock signal K (Step 118 of FIG. 11) whereby the next ignition is corrected to be made at a time point t12 retarded by an angle $\theta_4$ from the reference time t11 (steps 119 and 120 of FIG. 11), with the result that even the successively arising knocks at the low level can be sufficiently suppressed so that the engine is properly operated without knocks.

In this case, the angle $\theta_4$ is larger than the angle $\theta_3$ and the difference therebetween, i.e. a correction angle is $\theta_4-\theta_3$ which corresponds to the level (V) of the knock signal K. Thus, if the actual controlled variable largely varies upward beyond the reference controlled variable read out from the memory 12 by a predetermined value or more, knocks can be suppressed following a large variation in the cause for the occurrence of the engine knocks by correcting the stored reference controlled variable. As a result, a reference control signal having an adequate value can always be obtained corresponding to the variations in seasons as in the above noted occurrence factor of knocks.

On the other hand, since engine knocks frequently arise in a transient operating condition rather than the above noted steady operating condition, a controlled variable necessary for the suppression of knocks in the transient condition is larger than that in the steady condition. However, upon the suppression of engine knocks, it is necessary to improve the performance of the system as goods by taking account of the automotive characteristic (usage, noise shielding, etc.), the entire system, and even the cost thereof, without mere reference to the dynamic performance of the engine. Therefore, the above calculation of the correction magnitude is required to be properly carried out so as to enable various controls on the basis of various conditions without restricting them to any particular one.

Figure 12:
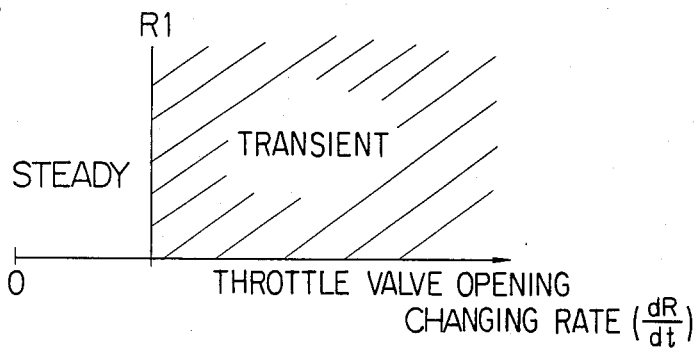
FIG. 12 shows a border line between the steady and the transient states of an engine in relation to the rate of change of the opening of a throttle valve.

In this second embodiment, the above noted transient operating condition, i.e. the transient state is detected by the variation of the resistance of the variable resistor 15 moved by the interconnected operation of the throttle valve 13 disposed within the inlet air pipe 14. The variation of the resistance R of the variable resistor 15 is inputted into the calculator 11 in which the varying rate dR/dt of the resistance is calculated as a throttle valve opening changing rate and is compared with a predetermined value R1 as shown in Step 114 of FIG. 11. This predetermined value R1 is adapted, as shown in FIG. 12, such that if dR/dt is below R1, then the engine exhibits its steady condition while if dR/dt is above R1, then the engine exhibits its transient condition (acceleration condition).

Examples for explaining the calculation method of the correction variable in the transient state thus detected in Step 114 of FIG. 11 are shown in FIGS. 13–16.

Figure 13:
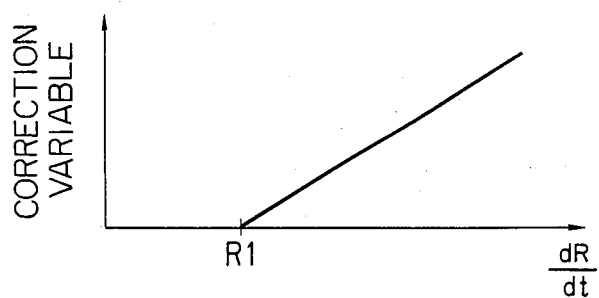
FIG. 13 shows one example of a relationship between a correction variable and a rate of change of the opening of the throttle valve.

FIG. 13 shows a method of determining the correction variable corresponding to the changing rate of the opening of the throttle valve 13 in which the calculations respectively of the changing rate (dR/dt) of the throttle valve opening and the correction variable (K) are required to obtain K(dR/dt) shown within Step 121 of FIG. 11. However, it is advantageous in that a large value of the controlled variable corrected following the increase of the load is easily obtainable which conforms to he basic characteristic of engine knocks in the transient state.

Figure 14:
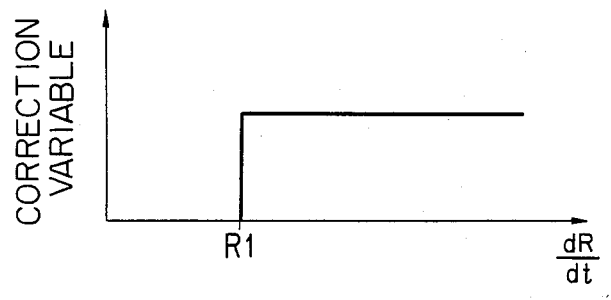
FIG. 14 shows another example of a relationship between a correction variable and a rate of change of the opening of the throttle valve.

FIG. 14 shows a method of correction by adding to the controlled variable (Vr5) a constant correction variable (V) regardless of the changing rate of the throttle opening in the transient state. In this method shown in Step 121, different from the method of FIG. 13, since the magnitude of the load is not reflected in the calculation, there is a possibility that the corrected variable becomes insufficient or excessive. However, the determination of whether the engine exhibits the steady or transient state may simply be carried out.

Figure 15:
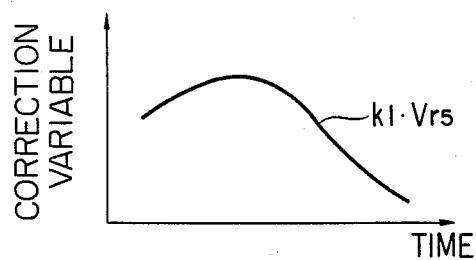
FIGS. 15 and 16 respectively show one example of a relationship between a correction variable and time.

FIG. 15 shows a method of correction by adding the reference controlled variable (Vr5) with a constant value (k1xVr5) multiplied by a coefficient k1 regardless of the changing rate of the throttle opening in the transient state. In this method shown in Step 121, since the reference controlled variable of the memory 12 varies corresponding to the operating condition which varies with time, the correction variable also varies with time. Also, the reference controlled variable Vr5 has a value necessary for the suppression of the knocks under the steady state and represents the frequency of the occurrence of knocks in various operating conditions. However, because the correction variable is determined on the basis of the reference controlled variable, a correction reflecting the characteristic of the engine can be carried out.

Figure 16:
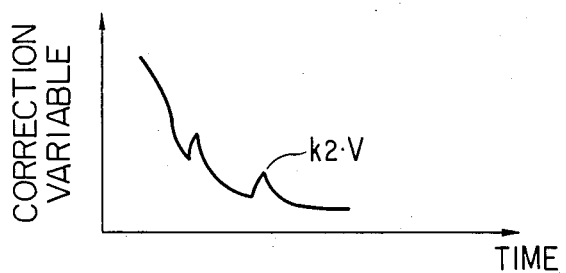

FIG. 16 shows a method of correction by adding the reference controlled variable (Vr5) with K1xV obtained by multiplying the value (V) of the knock signal K with a coefficient K1. In this method also shown in Step 121, since a real time correction is carried out on the basis of the magnitude of knocks occurring, it is possible to make a correction corresponding to the operation condition of the engine which varies momentarily.

Actually, by the combination of the above methods for the adaptation of the same for an automobile, a knock suppression system excellent in the performance can be realized.

According to the second embodiment, particularly, since the transient operation condition of an engine is detected to correct the reference controlled variable stored in memory corresponding to the condition, even in a transient operating condition giving rise to a large variation of a factor causing the occurrence of knocks, an adequate knock suppression can be effectively carried out to deal with the operating condition.

Next, a third embodiment of a knock suppression system for an internal combustion engine will now be described.

This embodiment intends to detect the transient state of an engine when the changing rate of the throttle valve opening exceeds a predetermined value as above described while the correction of the controlled variable is carried out for a predetermined time interval after the transient condition has been detected. Furthermore, by causing this "correction period" to correspond to the changing rate of the throttle valve opening, knocks under the transient condition are suppressed by an adequate controlled variable.

The arrangement of this third embodiment is the same as that in FIG. 10. Also, the flow chart used in this embodiment is the same as that in the second embodiment shown in FIG. 11 except for the substitution of Step 130 in this embodiment for Step 121 in the second embodiment, as shown in FIG. 17.

Figure 18:
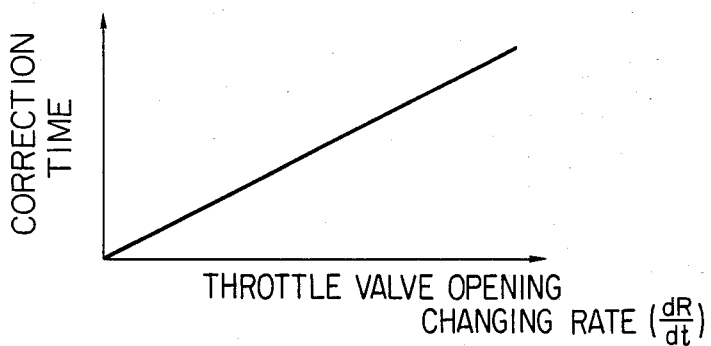
FIG. 18 shows one example of a relationship between a correction period and a rate of change of the opening of the throttle valve.

Namely, in Step 130, the above noted "correction period" is determined by utilizing the relationship between the correction period and the changing rate (dR/dt) of the opening of the throttle valve 13 shown in FIG. 18. This figure shows that the correction period is proportional to the changing rate of the opening of the throttle valve 13.

Figure 19:
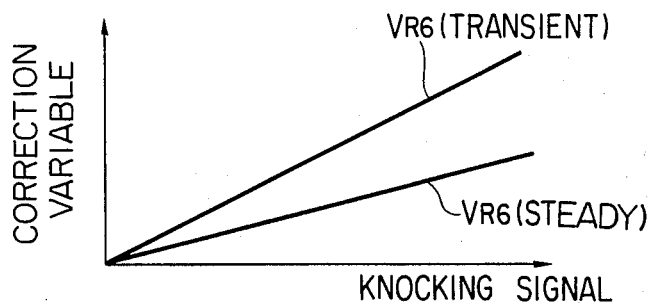
FIG. 19 shows a relationship between a correction variable and knock signals with reference to the steady and the transient states of an engine.

FIG. 19 shows one example of the correction of the controlled variable. In the steady state which is detected only in the first embodiment of this invention, the controlled variable Vr5 is obtained whereas in the transient state which is detected in the second and third embodiments of this invention the increased or added correction variable Vr6 is obtained.

For a control means for the suppression of knocks, such an ignition timing control device as indicated in the above embodiment or an air/fuel ratio control device by a fuel control is desirable. This is because such an ignition timing control device and an air/fuel ratio control device have been already practically used in many cars so that the adaptation of these devices to this invention is easy and is realized at a low cost. For such an air/fuel ratio control device, the injection amount of fuel by a fuel injection device may well be increased by a reference control signal corresponding to the knock signal.

According to the second and third embodiments, particularly, since the transient operation condition of an engine is detected to correct the reference controlled variable stored in memory corresponding to the condition, even in a transient operating condition giving rise to a large variation of a factor causing the occurrence of knocks, an adequate knock suppression can be effectively carried out which can deal with the operating condition.

It is to be noted that while the present invention has been described with reference to the above embodiments illustrated in the accompanying drawings, it should not be limited to them and may be applied with various modifications thereof without departing from the spirit of the invention.

What we claim is:

1. A knock suppression system for an internal combustion engine comprising:
    means for detecting the load condition of said eninge;
    means for detecting the rotating speed of said engine;
    means for detecting a knock signal at a level corresponding to the knock intensity of said engine;
    means for determining whether the operating condition of said engine is steady;
    storage means for storing a reference-controlled variable for the suppression of knocks corresponding to the level of said knock signal when it is determined by said determining means that the operating condition of said engine determined from said rotating speed and said load condition is steady;
    means for correcting said reference-controlled variable according to the magnitude of said knock signal including means for determining whether said knock signal is larger than a predetermined value; and
    means for retarding an ignition signal to be applied to the ignition coil of said engine according to said corrected reference-controlled variable.

2. A knock suppression system for an internal combustion engine as claimed in claim 1 wherein said correcting means comprises means for adding said reference controlled variable with a value corresponding to the level of said knock signal when said knock signal is found to be larger than said predetermined value.

3. A knock suppression system for an internal combustion engine as claimed in claim 2, further comprising means for updating said reference controlled variable to said added reference controlled variable in said storage means when it is determined that said knock signal is still larger than said predetermined value and the operating condition of said engine is still steady.

4. A knock suppression system for an internal combustion engine as claimed in claim 1 wherein said correcting means comprises means for subtracting a value corresponding to the level of said knock signal from said reference controlled variable when it is determined that the knock signal is not larger than said predetermined value.

5. A knock suppression system for an internal combustion engine as claimed in claim 4 wherein said correcting means further comprises means for updating said reference controlled variable to said subtracted reference controlled variable in said storage means.

6. A knock suppression system for an internal combustion engine comprising:
    means for detecting the load condition of said engine;
    means for detecting the rotating speed of said engine;
    means for detecting a knock signal at a level corresponding to the knock intensity of said engine;
    means for detecting a transient condition of said engine;
    storage means for storing a reference controlled variable, for the suppression of knocks, corresponding to the level of said knock signal when the operating condition of said engine determined from said rotating speed and said load condition is steady;
    means, responsive to said transient condition, for correcting said reference controlled variable to a predetermined correction variable; and
    means for retarding an ignition signal for the ignition coil of said engine according to said corrected reference controlled variable.

7. A knock suppression system for an internal combustion engine as claimed in claim 6 wherein said transient detecting means comprises means for reading in the resistance of a variable resistor interconnected with the throttle valve of said engine, means for calculating the rate change of said resistance, and means for determining whether or not said rate of change is larger than a predetermined value.

8. A knock suppression system for an internal combustion engine as claimed in claim 7 wherein said correcting means comprises means for correcting said reference controlled variable to a value proportional to said rate of change of said resistance.

9. A knock suppression system for an internal combustion engine as claimed in claim 7 wherein said correcting means comprises means for correcting said reference controlled variable to the summation of said reference controlled variable and to the level of said knock signal.

10. A knock suppression system for an internal combustion engine as claimed in claim 7 wherein said correcting means comprises means for correcting said reference controlled variable to the summation of said reference controlled variable multiplied by a constant and said reference controlled variable.

11. A knock suppression system for an internal combustion engine as claimed in claim 7 wherein said correcting means comprises means for correcting said reference controlled variable to the summation of said reference controlled variable and the level of said knock signal multiplied by a constant.

12. A knock suppression system for an internal combustion engine as claimed in claim 6 wherein said correcting means comprises means for carrying out said correction for a time interval proportional to said rate of change of said resistance.

* * * * *